United States Patent
Doi

(10) Patent No.: US 12,384,051 B2
(45) Date of Patent: Aug. 12, 2025

(54) ROBOT

(71) Applicant: TOYOTA JIDOSHA KABUSHIKI KAISHA, Toyota (JP)

(72) Inventor: Masahiro Doi, Chofu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/508,402

(22) Filed: Nov. 14, 2023

(65) Prior Publication Data

US 2024/0253245 A1 Aug. 1, 2024

(30) Foreign Application Priority Data

Jan. 24, 2023 (JP) ................. 2023-008858

(51) Int. Cl.
  *B25J 13/08* (2006.01)
(52) U.S. Cl.
  CPC .................. *B25J 13/088* (2013.01)
(58) Field of Classification Search
  CPC ...................................... B25J 13/088
  See application file for complete search history.

(56) References Cited

U.S. PATENT DOCUMENTS

| | | | |
|---|---|---|---|
| 2006/0173578 A1* | 8/2006 | Takenaka | B62D 57/032 700/245 |
| 2006/0184276 A1 | 8/2006 | Takenaka et al. | |
| 2006/0247799 A1 | 11/2006 | Takenaka et al. | |
| 2011/0264264 A1* | 10/2011 | Shirokura | B25J 19/0008 901/1 |

FOREIGN PATENT DOCUMENTS

| | | | | |
|---|---|---|---|---|
| JP | 3677623 B2 * | 8/2005 | ........... | B62D 57/032 |
| JP | 2013184232 A * | 9/2013 | | |
| WO | 2005/000534 A1 | 1/2005 | | |
| WO | 2005/000535 A1 | 1/2005 | | |

* cited by examiner

*Primary Examiner* — Adam R Mott
*Assistant Examiner* — Sagar KC
(74) *Attorney, Agent, or Firm* — SoraIP, Inc.

(57) ABSTRACT

A robot that moves on a leg, the robot comprising: a calculation unit that calculates a floor reaction force moment around a vertical axis from a center of gravity and a ZMP trajectory of the robot and a moment orbit around the center of gravity, and obtains a correction amount of a moment vector around the center of gravity when the floor reaction force moment around the vertical axis exceeds a frictional limit; and a control unit that controls the robot based on the correction amount.

4 Claims, 8 Drawing Sheets

FIG. 4
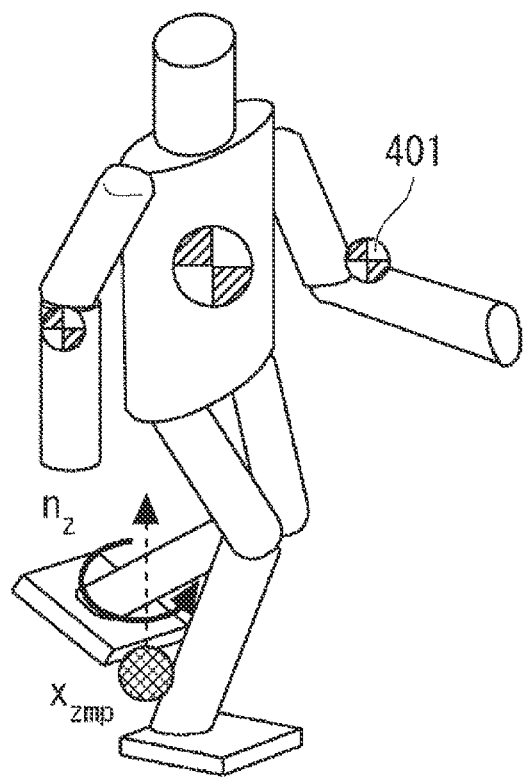
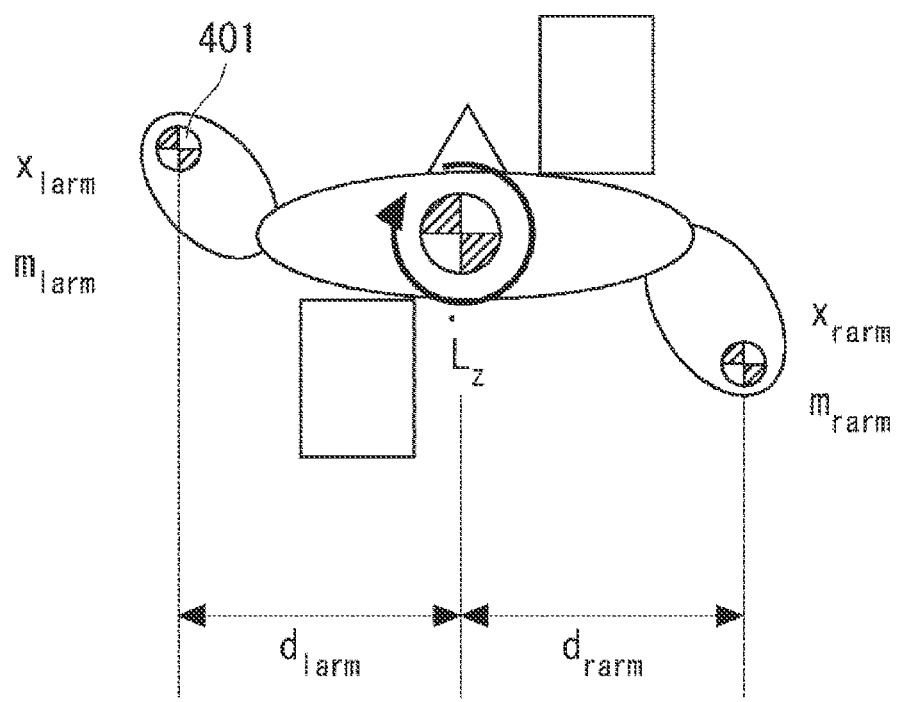

ROBOT

CROSS-REFERENCE TO RELATED APPLICATION

This application claims priority to Japanese Patent Application No. 2023-008858 filed on Jan. 24, 2023, incorporated herein by reference in its entirety.

BACKGROUND

1. Technical Field

The present disclosure relates to a robot.

2. Description of Related Art

WO 2005/000535 describes setting an allowable range of a limit target amount that is a vertical component of a floor reaction force moment, a floor surface normal direction component of the floor reaction force moment, a vertical component of an angular momentum change rate of a robot, or a floor surface normal direction component of the angular momentum change rate. Further, at least a temporary instantaneous value of a target motion is input to a dynamic model, and a model limit target amount instantaneous value is obtained as an output of the dynamic model. WO 2005/000535 describes that an instantaneous value of the target motion is determined by revising the temporary instantaneous value of the target motion so that at least the model limit target amount instantaneous value falls within the allowable range.

SUMMARY

WO 2005/000535 describes correcting the arm swing acceleration so as to fall within upper and lower limit values of the floor reaction force moment around a vertical axis. However, there is a possibility that the floor reaction force moment cannot be adjusted only by the force generated by the arm swing. Therefore, an object of the present disclosure is to provide a robot that adjusts the floor reaction force moment by correcting a moment vector around the center of gravity.

The robot of the present disclosure is a robot that moves with a leg including a calculation unit that calculates a floor reaction force moment around a vertical axis from the center of gravity of the robot, a zero moment point (ZMP) orbit, and a moment orbit around the center of gravity, and obtains a correction amount of a moment vector around the center of gravity when the floor reaction force moment around the vertical axis exceeds a frictional limit, and a control unit that controls the robot based on the correction amount.

According to the above feature, it is possible to provide a robot that adjusts the floor reaction force moment by correcting the moment vector around the center of gravity.

The robot of the present disclosure features the calculation unit obtaining the correction amount so as to minimize a norm.

The above feature is because the correction amount is preferably as small as possible.

The robot of the present disclosure features the control unit correcting acceleration and deceleration of a center of gravity orbit according to the correction amount.

According to the above feature, the moment vector around the center of gravity can be corrected without fluctuating the ZMP by changing the acceleration of the center of gravity.

The robot of the present disclosure features the calculation unit determining, when the floor reaction force moment around the vertical axis exceeds the frictional limit, whether a correction amount of a moment around the center of gravity of the vertical axis exceeds a limit value, the control unit correcting, when the correction amount of the moment around the center of gravity of the vertical axis does not exceed a limit, only the moment around the center of gravity of the vertical axis, and the moment vector around the center of gravity corrected when the correction amount of the moment around the center of gravity of the vertical axis exceeds the limit.

The above feature is because, when a moment component around the center of gravity around a horizontal axis is corrected, the ZMP is deviated from an assumption, and therefore, when the correction of the moment around the center of gravity of the vertical axis alone can be dealt with, it is preferable to correct only the moment around the center of gravity of the vertical axis.

The robot of the present disclosure features the calculation unit calculating the moment around the center of gravity of the vertical axis based on a movable range and a speed range of an arm swing and a body twist, and the control unit compensating the floor reaction force moment around the vertical axis based on the calculated moment around the center of gravity of the vertical axis.

According to the above feature, the correction amount of the moment around the center of gravity of the vertical axis can be determined from a vertical axis moment that can be generated by the arm swing and the body twist.

According to the present disclosure, it is possible to provide a robot that adjusts the floor reaction force moment by correcting the moment vector around the center of gravity.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 4 is a diagram illustrating a positional relationship with a center of gravity of an arm of a robot according to a fourth embodiment;

DETAILED DESCRIPTION OF EMBODIMENTS

First Embodiment

Figure 1:
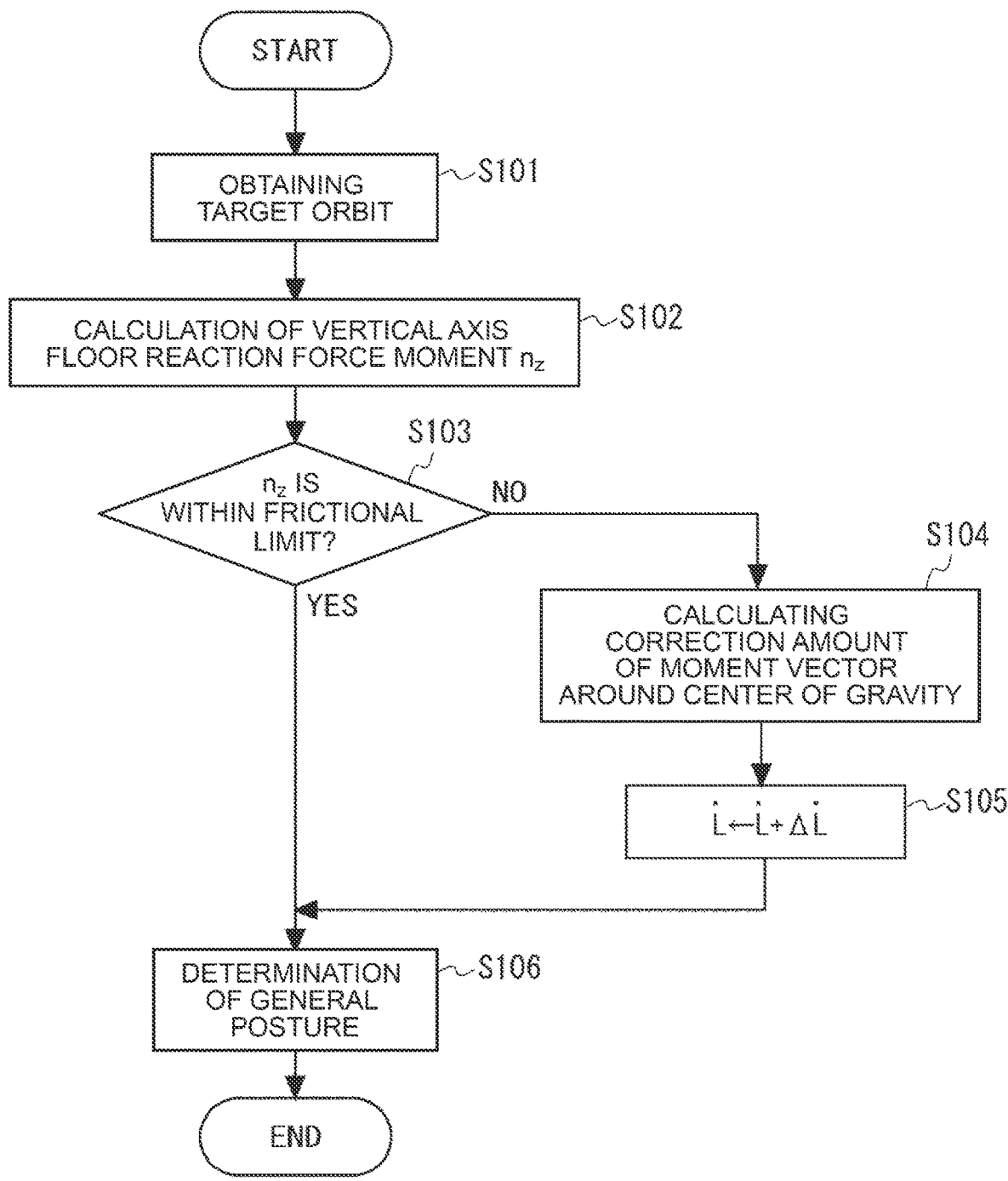
FIG. 1 is a flowchart for determining a correction amount of a moment vector around a center of gravity according to a first embodiment.

Hereinafter, embodiments of the present disclosure will be described with reference to the drawings. However, the disclosure according to the claims is not limited to the following embodiments. Further, not all of the configurations described in the embodiments are essential as means for solving the problem. For clarity of explanation, the following description and the drawings are omitted and simplified as appropriate. In the drawings, the same elements are denoted by the same reference numerals. Further, duplicate descriptions are omitted as necessary.

DESCRIPTION OF RELATED ART

A robot moving by a related leg includes a calculation unit that calculates an attitude of the robot, and a control unit that controls the attitude of the robot. The calculation unit and the control unit of the robot may be incorporated in the inside of the robot, or the robot may be operated remotely. The processing of the calculation unit and the control unit is executed using a processor that executes a program for executing the processing (for example, a Central Processing Unit (CPU), a central processing unit), and a memory that stores the program.

The equation of motion for the center of gravity of the legged mobile robot is a balance equation of translational force.

$$\dot{P} = \sum f_i - mg \qquad \text{Mathematical Formula 1}$$

is described as a moment balance formula, and $$\dot{L} = \sum (p_i - c) \times f_i + n_i \qquad \text{Mathematical Formula 2}$$

is described. Here, P· and L· are the translational force of the center of gravity and the moment around the center of gravity, respectively, $f_i$ is the floor reaction force. $n_i$ is the floor reaction force moment. Note that, for convenience, a dot (·) above a symbol indicating a differential is shown behind the symbol with respect to the translational force of the center of gravity and the moment around the center of gravity, and may be shown as P·, L·. Other symbols to be described later may also be shown in the same manner. From this equation, $$m \begin{bmatrix} \ddot{x}_g \\ \ddot{y}_g \\ \ddot{z}_g \end{bmatrix} = \sum \begin{bmatrix} f_{x,i} \\ f_{y,i} \\ f_{z,i} \end{bmatrix} - m \begin{bmatrix} 0 \\ 0 \\ g \end{bmatrix} \qquad \text{Mathematical Formula 3}$$

and $$\begin{bmatrix} \dot{L}_x \\ \dot{L}_y \\ \dot{L}_z \end{bmatrix} = \sum \begin{bmatrix} p_{x,i} - x_g \\ p_{y,i} - y_g \\ p_{z,i} - z_g \end{bmatrix} \times \begin{bmatrix} f_{x,i} \\ f_{y,i} \\ f_{z,i} \end{bmatrix} + \begin{bmatrix} n_{x,i} \\ n_{y,i} \\ n_{z,i} \end{bmatrix} \qquad \text{Mathematical Formula 4}$$

are derived. Here, xyz represents an axis of a three-dimensional Cartesian coordinate system. Specifically, x represents an axis along the front-rear direction of the robot. y represents an axis along the left-right direction. z represents an axis along the vertical direction.

It is zero moment point (ZMP) that the floor reaction force moment around the horizontal-axis becomes zero with respect to the equation of motion of the center of gravity. The equilibrium equation for the moment in ZMP are described below.

Mathematical Formula 5

$$\dot{L}_x = m\ddot{y}_g(z_g - z_{zmp}) - m(\ddot{z}_g + g)(y_g - y_{zmp}) \qquad (1)$$

Mathematical Formula 6

$$\dot{L}_y = m(\ddot{z}_g + g)(x_g - x_{zmp}) - m\ddot{x}_g(z_g - z_{zmp}) \qquad (2)$$

Mathematical Formula 7

$$\dot{L}_z = m\ddot{x}_g(y_g - y_{zmp}) - m\ddot{y}_g(x_g - x_{zmp}) + n_z \qquad (3)$$

When Equations (1) and (2) are modified, $$\ddot{x}_g = \frac{m(\ddot{z}_g + g)(x_g - x_{zmp}) - \dot{L}_y}{m(z_g - z_{zmp})} \qquad \text{Mathematical Formula 8}$$

$$\ddot{y}_g = \frac{m(\ddot{z}_g + g)(y_g - y_{zmp}) + \dot{L}_x}{m(z_g - z_{zmp})} \qquad \text{Mathematical Formula 9}$$

that are well-known ZMP equations are derived. In the following description, for convenience, dots are shown behind symbols, and a moment around the center of gravity of the vertical axis is shown as a moment $L_z\cdot$.

Here, ZMP equation is based on the assumption that Equation (3) is satisfied. However, a floor reaction force moment $n_z$ around the vertical axis of ZMP depends on the frictional action between the floor and the sole of the foot. Therefore, Equation (3) is not always satisfied. In this way, it is possible to calculate the floor reaction force moment around the vertical axis from ZMP orbit and the moment orbit around the center of gravity. If Equation (3) is not true, i.e., $n_z$ is insufficient, the sole slides about Yaw shaft. This may cause problems such as unstable grounding and falling.

Therefore, in order to satisfy Equation (3), Equations (1) and (2) have not been changed, and moments $L_z\cdot$ around the center of gravity of the vertical axis have been corrected to cope with them. For example, if $n_z^{limit}$ is a limit value of $n_z$ due to the frictional limit and $n_z$ is greater than the limit value, then the moment $L_z\cdot$ around the center of gravity of the vertical axis is corrected, such as $\Delta L_z\cdot = n_z - n_z^{limit}$. By doing this, $n_z$ may be restricted to within $n_z^{limit}$ as follows.

Mathematical Formula 10

$$n_z = \dot{L}_z + \Delta\dot{L}_z - m\ddot{x}_g(y_g - y_{zmp}) + m\ddot{y}_g(x_g - x_{zmp})$$

Mathematical Formula 11

$$\Rightarrow n_z^{limit} = \dot{L}_z - m\ddot{x}_g(y_g - y_{zmp}) + m\ddot{y}_g(x_g - x_{zmp})$$

$$\Delta\dot{L}_x \qquad \text{Mathematical Formula 12}$$

is the correction amount of the moment around the center of gravity of the vertical axis. In the following description, for convenience, the correction amount of the moment around the center of gravity of the vertical axis may be indicated as $\Delta L_z\cdot$ with dots shown behind the symbols. Specifically, it is compensated by generating an angular acceleration with respect to the inertia around the vertical axis, such as increasing the swing of the arm or increasing the twist of the trunk.

As can be seen from the above, the moment $L_z\cdot$ around the center of gravity of the vertical axis takes a large value in order to realize high-speed running or dynamic movement, for example, by swinging the swinging leg. Therefore, on the assumption that the friction does not change, a larger value is required for the correction amount $\Delta L_z\cdot$. However, the moment around the center of gravity of the vertical axis, which may be generated in an operation such as an additional arm swing or torsion of the trunk, is limited in terms of range of motion and joint velocity. For this reason, for example, when the traveling speed increases, there arises a problem that the excess of the frictional limit of $n_z$ cannot be compensated by the correction amount $\Delta L_z\cdot$.

Description of Modification of Moment Vector Around Center of Gravity According to First Embodiment FIG. 1 is a flowchart for obtaining a correction amount of a moment vector around a center of gravity according to a first embodiment. With reference to FIG. 1, the correction of the moment vector around the center of gravity according to the first embodiment will be described.

The present disclosure proposes to deal with the shortage of the floor reaction force moment around the vertical axis not only by modifying the moment around the center of gravity of the vertical axis but also by modifying the moment around the center of gravity of all three axes, i.e. the moment vector around the center of gravity. Further, since it is desired that the correction amount be as small as possible, it is preferable that the correction amount of the moment vector around the center of gravity be determined so that the norm thereof is minimized.

First, $L\cdot$ and $p$ are defined as follows, where $L\cdot$ is the moment vector around the center of gravity and $p$ is the vector representing the position of the center of gravity as viewed from ZMP.

Mathematical Formula 13

$$L := \begin{bmatrix} \dot{L}_x \\ \dot{L}_y \\ \dot{L}_z \end{bmatrix}, \; p := \begin{bmatrix} p_x \\ p_y \\ p_z \end{bmatrix} := \begin{bmatrix} x_g - x_{zmp} \\ y_g - y_{zmp} \\ z_g - z_{zmp} \end{bmatrix} \quad (4)$$

From Equations (1), (2), and (3),

Mathematical Formula 14

$$\frac{\dot{L}^T p}{p_z} = n_z \quad (5)$$

is established. Now, consider that if $n_z$ exceeds $n_z^{limit}$, the moment vector around the center of gravity is modified to limit $n_z$ within $n_z^{limit}$ by correcting the correction amount $\Delta L\cdot$. On the assumption that the center of gravity orbit is not changed, when the correction amount $\Delta L\cdot$ is corrected, ZMP fluctuates from Equation (1) and Equation (2). The variation of ZMP is expressed by Equations (1) and (2).

Mathematical Formula 15

$$\Delta x_{zmp} = -\frac{\Delta \dot{L}_y}{m(\ddot{z}_g + g)} \quad (6)$$

Mathematical Formula 16

$$\Delta y_{zmp} = \frac{\Delta \dot{L}_x}{m(\ddot{z}_g + g)} \quad (7)$$

Therefore, the variation $\Delta p$ of $p$ is

Mathematical Formula 17

$$\Delta p = \frac{1}{m(\ddot{z}_g + g)} \begin{bmatrix} \Delta \dot{L}_y \\ -\Delta \dot{L}_x \\ 0 \end{bmatrix} = \frac{1}{m(\ddot{z}_g + g)} \begin{bmatrix} 0 & -1 & 0 \\ 1 & 0 & 0 \\ 0 & 0 & 0 \end{bmatrix} \Delta \dot{L} := T_p \Delta \dot{L} \quad (9)$$

It becomes.

Therefore, when the correction amount $\Delta L\cdot$ is modified to restrict $n_z$ within $n_z^{limit}$, Equation (5) is:

Mathematical Formula 18

$$(\dot{L} + \Delta \dot{L})^T (p + T_p \Delta \dot{L}) = p_x n_x^{limit} \quad (10)$$

It becomes. Since it is desirable that the correction amount $\Delta L\cdot$ is as small as possible, $$\Delta \dot{L}^T \Delta \dot{L} \qquad \text{Mathematical Formula 19}$$

It is conceivable to minimize. Next optimization problem

Mathematical Formula 20

$$\min \frac{1}{2} \Delta \dot{L}^T \Delta \dot{L} \; \text{s.t.} \; (\dot{L} + \Delta \dot{L})^T (p + T_p \Delta \dot{L}) = p_z n_z^{limit} \quad (11)$$

Is configured. The optimization problem (11) uses a Lagrangian multiplier $\lambda$ to obtain a Lagrangian function Mathematical Formula 21

$$H = \frac{1}{2} \Delta \dot{L}^T \Delta \dot{L} + \lambda \left( (\dot{L} + \Delta \dot{L})^T (p + T_p \Delta \dot{L}) - p_z n_z^{limit} \right)$$

Thus, the correction amount $\Delta L\cdot$ can be solved analytically.

Mathematical Formula 22

$$\frac{\partial H}{\partial \Delta \dot{L}} = \Delta \dot{L}^T + \lambda \left( \dot{L}^T T_p + p \right)^T = 0$$

→

Mathematical Formula 23

$$\lambda = -\frac{(n_z^{limit} - n_z) p_z}{(\dot{L}^T T_p + p)^T (\dot{L}^T T_p + p)}$$

-continued

Mathematical Formula 24

$$\frac{\delta H}{\partial \lambda} = (\dot{L} + \Delta \dot{L})^T (p + T_p \Delta \dot{L}) - p_z n_z^{limit} = 0$$

→

Mathematical Formula 25

$$\Delta \dot{L} = \frac{p_z(n_z^{limit} - n_z)}{\left\| \dot{L}^T T_p + p \right\|^2} (\dot{L}^T T_p + p) \qquad (12)$$

As described above, the correction amount ΔL· can be obtained. Here, the calculation when $n_z$ exceeds the upper limit value $n_z^{limit}$ is shown, but when the lower limit value $-n_z^{limit}$ is lower than the lower limit value, the correction amount ΔL· can be obtained by the same calculation.

As shown in FIG. 1, a target orbit is obtained by Equation (4) (S101). According to Equation (5), the vertical axis-surrounding floor reaction force moment $n_z$ is calculated (S102). Next, it is determined whether $n_z$ is within the frictional limits (S103). If $n_z$ is within the frictional limits (for Yes of S103), the whole body attitude is determined (S106). If $n_z$ is not within the frictional limits (for No of S103), the correction amount of the moment vector around the center of gravity is calculated by Equation (12) (S104). After calculating the correction amount (S105), the whole-body position is determined (S106). In this way, a robot can be provided that modifies the moment vector around the center of gravity to adjust the floor reaction force moment.

Figure 2:
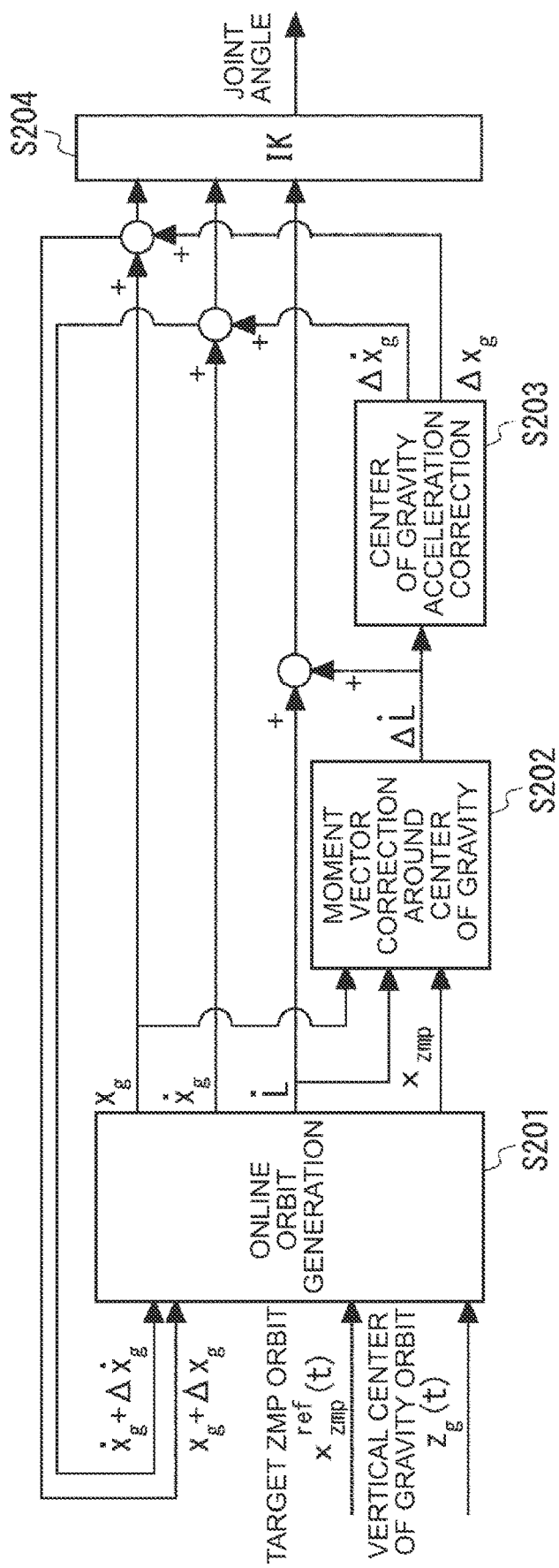
FIG. 2 is a block diagram for determining a correction amount of a moment vector around a center of gravity according to a second embodiment.

Description of Correction of Moment Vector Around Center of Gravity According to Second Embodiment FIG. 2 is a block diagram for determining the correction amount of the moment vector around the center of gravity according to the second embodiment. With reference to FIG. 2, the correction of the moment vector around the center of gravity according to the second embodiment will be described.

In the first embodiment, the moment vector L· around the center of gravity is corrected without changing the center of gravity orbit, so that ZMP fluctuates, but the moment vector L· around the center of gravity can be corrected without changing ZMP by changing the center of gravity acceleration.

In this case, from Equations (1) and (2), the amount of change in the center of gravity acceleration is calculated as follows.

Mathematical Formula 26

$$\Delta \ddot{x}_g = -\frac{\Delta \dot{L}_y}{m(z_g - z_{zmp})} \qquad (13)$$

Mathematical Formula 27

$$\Delta \ddot{y}_g = \frac{\Delta \dot{L}_x}{m(z_g - z_{zmp})} \qquad (14)$$

It becomes. In the present embodiment, since ZMP does not vary, Δp=0. Thus, the optimization problem is:

Mathematical Formula 28

$$\min \frac{1}{2} \Delta \dot{L}^T \Delta \dot{L} \text{ s.t. } (\dot{L} + \Delta \dot{L})^T p = p_z n_z^{limit} \qquad (15)$$

And the Lagrangian function

Mathematical Formula 29

$$H = \frac{1}{2} \Delta \dot{L}^T \Delta \dot{L} + \lambda ((\dot{L} + \Delta \dot{L})^T p - p_z n_z^{limit})$$

The correction amount ΔL· is obtained by the same procedure as in the first embodiment using Mathematical Formula 30

$$\Delta \dot{L} = \frac{p_z(n_z^{limit} - n_z)}{\|p\|^2} p \qquad (16)$$

It can be obtained as follows.

When the center of gravity orbit is changed, the center of gravity orbit at a subsequent time is also affected and diverges. Therefore, in the method of the present embodiment, it is essential to regenerate the orbit in accordance with the changed center of gravity orbit in combination with the online orbit generation.

FIG. 2 is a block diagram showing a combination of online orbit generation and the correction amount of the moment vector around the center of gravity. The center of gravity orbit is regenerated from the position and speed of the center of gravity after acceleration and deceleration, and the movement can be stably continued by transferring the changed amount of the center of gravity to the online orbit generation as the current value by adjusting the center of gravity acceleration. Modification of the moment vector around the center of gravity is performed using Equation (16). In addition, the center of gravity acceleration is corrected by using Equations (13) and (14).

Further, the present embodiment can be used simultaneously with the first embodiment, by distributing the Equations (6), (7), (13), and (14) at a constant rate, the variation of ZMP, the Equation (6), can be configured in such a manner that the Equation (7) is reduced. In this case, the correction amount ΔL· is calculated using Equation (12) with $T_p \rightarrow kT_p$, and the center of gravity orbit is updated by multiplying the acceleration correction amounts of Equations (13) and (14) by (1−k).

In this way, it is possible to correct the moment vector around the center of gravity without changing ZMP by changing the center of gravity.

Figure 3:
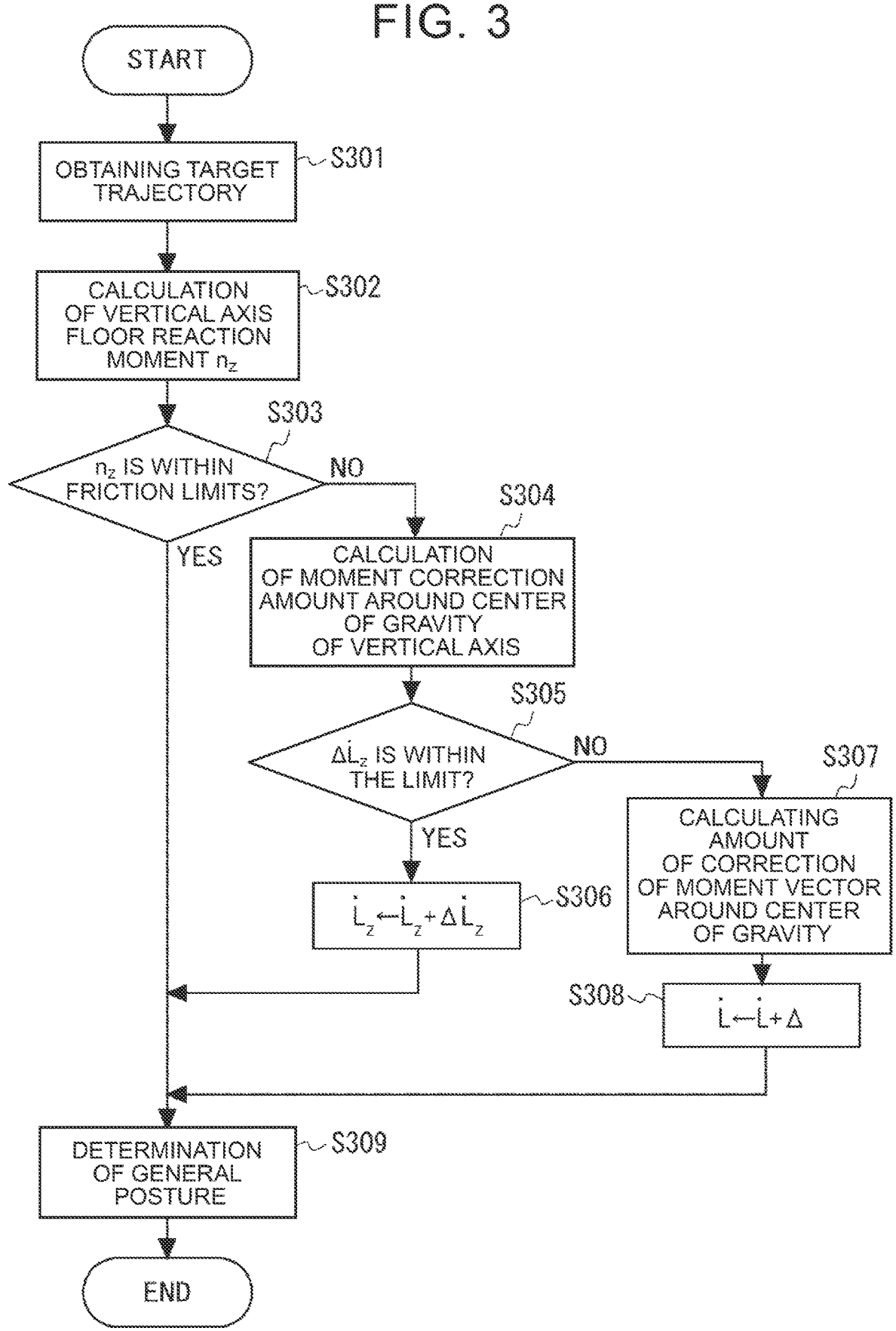
FIG. 3 is a flowchart for determining a correction amount of a moment vector around a center of gravity according to a third embodiment.

Description of Correction of Moment Vector Around Center of Gravity According to Third Embodiment FIG. 3 is a flowchart for obtaining the correction amount of the moment vector around the center of gravity according to the third embodiment. With reference to FIG. 3, the correction of the moment vector around the center of gravity according to the third embodiment will be described.

In the first and second embodiments, when the vertical axis-surrounding floor reaction force moment exceeds the frictional limit, the moment vector L· around the center of gravity is corrected. However, if the moment components around the center of gravity around the horizon are modified, ZMP will deviate from the assumption. If only the correction of the moment around the center of gravity of the vertical axis $L_z$· can be applied, it is desirable to perform only the correction of the moment around the center of gravity of the vertical axis $L_z$·.

Therefore, in the third embodiment, the correction amount of the moment around the center of gravity of the vertical axis is calculated before the correction of the moment vector around the center of gravity of the first embodiment. It is determined whether the correction amount does not exceed the upper and lower limits $\Delta L_z^{lower\cdot}$, $\Delta L_z^{upper\cdot}$. A process of changing whether only the correction of the moment around the center of gravity of the vertical axis or the correction of the moment vector around the center of gravity is performed according to the determination result is added.

As described above, the correction amount $\Delta L_{z\cdot}$ $$\Delta L_{z\cdot} = n_z - n_z^{limit} \tag{17}$$

It is said. $\Delta L_z^{lower\cdot}$, $\Delta L_z^{upper\cdot}$ is here a predetermined fixed parameter.

As illustrated in FIG. 3, up to S301, S302, S303, S101, S102, S103 is the same as that of the first embodiment, and therefore, explanation thereof is omitted. If $n_z$ is not within the frictional limits (if S303 is No), then Equation (17) is used to calculate the correction amount of the moment about the center of gravity of the vertical axis (S304). Next, it is determined whether or not the correction amount $\Delta L_{z\cdot}$ is within the limit (S305). If the correction amount $\Delta L_{z\cdot}$ is within the limit (for Yes of S305), then the moment around the center of gravity of the vertical axis $L_{z\cdot}$ is corrected (S306). The general attitude is then determined (S309).

If the correction amount $\Delta L_{z\cdot}$ is not within the limit (for No of S305), the correction amount of the moment vector around the center of gravity is calculated (S307). Next, the moment vector around the center of gravity L· is corrected (S308). Finally, the systemic position is determined (S309).

When the moment around the center of gravity component around the horizontal axis is corrected, ZMP deviates from the assumption. Therefore, when the moment around the center of gravity of the vertical axis can be corrected only by the correction of the moment around the center of gravity of the vertical axis.

Figure 5:
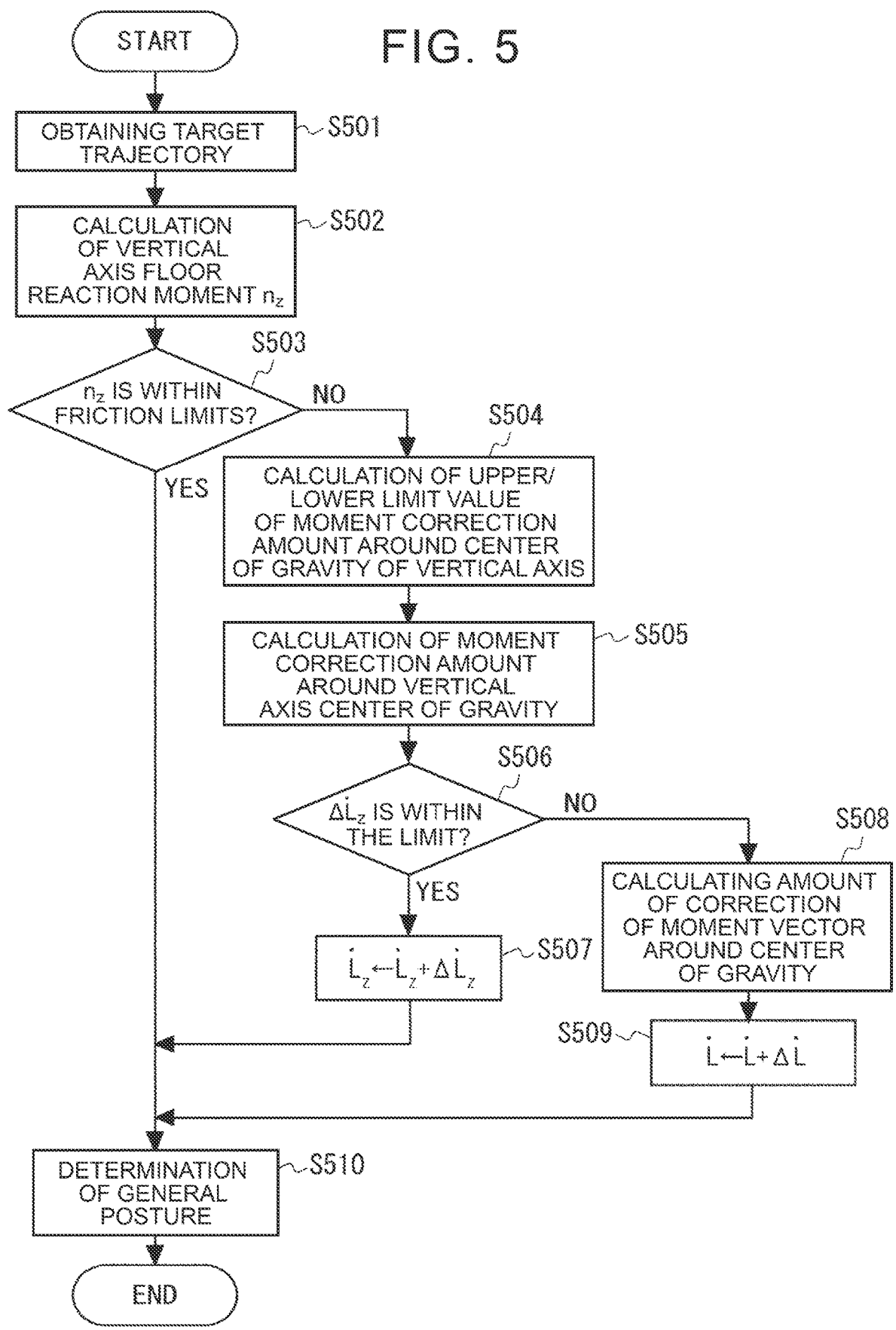
FIG. 5 is a flowchart for determining a correction amount of a moment vector around a center of gravity according to the fourth embodiment.

Description of Correction of Moment Vector Around Center of Gravity According to Fourth Embodiment FIG. 4 is a diagram illustrating a positional relationship with a center of gravity of an arm of the robot according to the fourth embodiment. FIG. 5 is a flowchart for obtaining the correction amount of the moment vector around the center of gravity according to the fourth embodiment. Referring to FIGS. 4 and 5, the correction of the moment vector around the center of gravity according to the fourth embodiment will be described.

In the third embodiment, the upper and lower limit values $\Delta L_z^{lower\cdot}$, $\Delta L_z^{upper\cdot}$ of the correction amount of the moment around the center of gravity of the vertical axis are set as fixed parameters. However, these parameters should originally be determined from the vertical axis moments that can be generated by arm swing or torsion. In the fourth embodiment, a process of setting $\Delta L_2^{lower\cdot}$, $\Delta L_z^{upper\cdot}$ is added from the limit of the movable range or speed which is the position for the preset arm swing or torsional motion.

FIG. 4 shows a schematic view and a top view of the robot. Reference numeral 401 denotes a center of gravity $m_{larm}$ of the entire left arm. Similarly, $m_{rarm}$ indicates the center of gravity of the entire right arm. $x_{larm}$, $x_{rarm}$ represents the travel direction position of the arm center of gravity, $d_{larm}$, $d_{rarm}$ represents the distance in the y-direction from the entire center of gravity to the arm center of gravity.

At this time, the arm swing, that is, the moment $\Delta L_{z\cdot}$ around the center of gravity of the vertical axis generated by the acceleration correction of the center of gravity of the arm is expressed as:

Mathematical Formual 31

$$\Delta \dot{L}_x = -m_{larm}d_{larm}\Delta \ddot{x}_{larm} + m_{rarm}d_{rarm}\Delta \ddot{x}_{rarm} \tag{18}$$

It is expressed.

When the limit on the position of each arm's center of gravity is defined as $x_{larm}^{lower}$, $x_{rarm}^{upper}$, and the limit on speed is defined as $\dot{x}_{larm}^{lower\cdot}$, $\dot{x}_{rarm}^{upper\cdot}$, (· represents a single derivative), the range of the acceleration correction amount of the arm's center of gravity $\Delta \ddot{x}^{larm\cdot\cdot}$, $\Delta \ddot{x}_{rarm}^{\cdot\cdot}$ (·· represents a two-time derivative) using a certain appropriate time constant τ, Mathematical Formula 32

$$-\ddot{x}_{larm}^{org} + \frac{-\dot{x}_{larm}^{limit} - \dot{x}_{larm}^{prev}}{\tau} \le \Delta \ddot{x}_{larm} \le -\ddot{x}_{larm}^{org} + \frac{\dot{x}_{larm}^{limit} - \dot{x}_{larm}^{prev}}{\tau}$$

Mathematical Formula 33

$$\Leftrightarrow a_{larm}^{vel} \le \Delta \ddot{x}_{larm} \le b_{larm}^{vel} \tag{19}$$

Mathematical Formula 34

$$-\ddot{x}_{larm}^{org} + \frac{\frac{x_{larm}^{lower} - x_{larm}^{prev}}{\tau} - \dot{x}_{larm}^{prev}}{\tau} \le \tag{20}$$

$$\Delta \ddot{x}_{larm} \le -\ddot{x}_{larm}^{org} + \frac{\frac{x_{larm}^{upper} - x_{larm}^{prev}}{\tau} - \dot{x}_{larm}^{prev}}{\tau}$$

Mathematical Formula 35

$$\Leftrightarrow a_{larm}^{pos} \le \Delta \ddot{x}_{larm} \le b_{larm}^{pos}$$

You can calculate as follows. Here, $x_{larm}^{org\cdot\cdot}$ is the original arm swing acceleration before correction. $x_{larm}^{prev}$, $\dot{x}_{larm}^{prev}$. is the position and velocity of the center of gravity of the arm in front of one control cycle. $a_{larm}^{vel}$, $b_{larm}^{vel}$ means the acceleration correction amount range due to the speed limit $a_{larm}^{pos}$, $b_{larm}^{pos}$ means the acceleration correction amount range due to the position limit, and here only the case of the left arm is described, but the same equation is derived for the right arm. Further, the sampling time Δt can be typically used for the time constant τ, but it is a coefficient that determines how long before the position limit is considered in time, and when the time constant is small, it is likely to cause a sudden acceleration change immediately before the position limit, it is preferable to use a value larger than Δt.

The upper and lower limits of the respective arm acceleration correction amounts are compared by comparing the ranges of the acceleration correction amounts according to the position and speed limits of Equations (19) and (20).

Mathematical Formula 36

$$\Delta \ddot{x} \le \Delta \ddot{x}_{larm} \le \Delta \ddot{x}_{larm}^{upper}$$

Mathematical Formula 37

$$\text{if } a_{larm}^{pos} < a_{larm}^{vel}: \Delta \ddot{x}_{larm}^{lower} = a_{larm}^{vel}$$

$$\text{else: } \Delta \ddot{x}_{larm}^{lower} = a_{larm}^{pos}$$

-continued

Mathematical Formula 38

$$\text{if } b_{larm}^{pos} > v_{larm}^{vel}: \Delta x_{larm}^{upper} = b_{larm}^{vel}$$

$$\text{else: } \Delta \ddot{x}_{larm}^{upper} = b_{larm}^{pos}$$

It can be determined as follows. Although only the left arm is described for the upper formula, the upper and lower limits can be calculated for the right arm by the exact same process. From Equations (19) and (20), finally, the upper and lower limit values of the correction amount of the moment around the center of gravity of the vertical axis are calculated.

Mathematical Formula 39

$$\Delta \dot{L}_z^{lower} \leq \Delta \dot{L}_x \leq \Delta \dot{L}_z^{upper}$$

Mathematical Formula 40

$$\Delta \dot{L}_z^{lower} = -m_{larm} d_{larm} \Delta \ddot{x}_{larm}^{upper} + m_{ramr} d_{rarm} \Delta \ddot{x}_{rarm}^{lower} \quad (21)$$

Mathematical Formula 41

$$\Delta \dot{L}_z^{upper} = -m_{larm} d_{larm} \Delta \ddot{x}_{larm}^{lower} + m_{ramr} d_{rarm} \Delta \ddot{x}_{rarm}^{upper} \quad (22)$$

It can be calculated as follows.

As shown in FIGS. 5, S501, S502, and S503 are the same as those in S101, S102, S103 of the first embodiment, and therefore will not be described. When $n_z$ is not within the frictional limits (in No of S503), the upper and lower limits of the correction amount of the moment around the center of gravity of the vertical axis are calculated by Equation (21) and Equation (22). Next, the correction amount of the moment around the center of gravity of the vertical axis is calculated by Equation (17). S506, S507, S508, S509, S510 are the same as those in S305, S306, S307, S308, S309 of the third embodiment, and therefore will not be described.

According to the above method, the correction amount of the moment around the center of gravity of the vertical axis can be determined from the vertical axis moment that can be generated by the arm swing and the torsion of the trunk. In the present embodiment, only the case where the moment around the center of gravity of the vertical axis due to the arm swing is corrected has been described. However, the correction of the moment around the center of gravity due to torsion of the torso can be similarly discussed, for example, by considering the range of motion of the torso Yaw shaft joint, the velocity limit, the torque limit, and the like.

Figure 6:
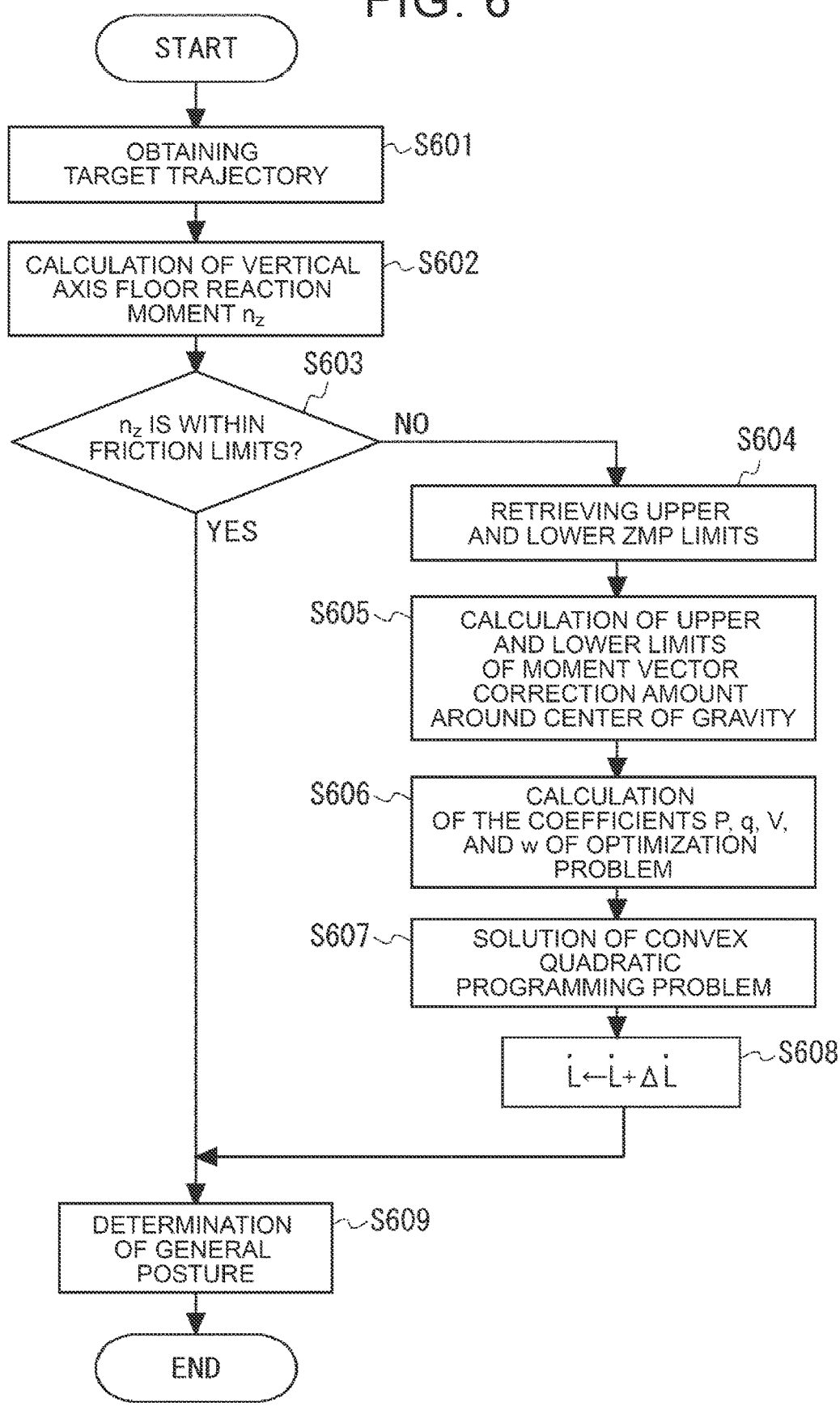
FIG. 6 is a flowchart for determining a correction amount of a moment vector around a center of gravity according to a fifth embodiment.

Description of Correction of Moment Vector Around Center of Gravity According to Fifth Embodiment FIG. 6 is a flowchart for obtaining the correction amount of the moment vector around the center of gravity according to the fifth embodiment. With reference to FIG. 6, the correction of the moment vector around the center of gravity according to the fifth embodiment will be described.

In the first embodiment, it is described that ZMP fluctuates with the correction of the moment vector around the center of gravity. In the fifth embodiment, a process of determining the correction amount ΔL· of the moment vector around the center of gravity after limiting ZMP variation amount is added so that ZMP does not protrude from the support area.

Since ZMP variation amount is expressed as in Equations (6) and (7), when the range of ZMP in the x and y directions is given by $x_{zmp}^{lower}$, $x_{zmp}^{upper}$, $y_{zmp}^{lower}$, $y_{zmp}^{upper}$, the upper and lower limits of the correction amount of the moment around the center of gravity of the horizontal axis are given by:

Mathematical Formula 42

$$m(\ddot{z}_g + g)(y_{zmp}^{lower} - y_{zmp}^{org}) \leq \Delta \dot{L}_x \leq m(\ddot{z}_g + g)(y_{zmp}^{upper} - y_{zmp}^{org}) \quad (23)$$

Mathematical Formula 43

$$-m(\ddot{z}_g + g)(y_{zmp}^{upper} - x_{zmp}^{org}) \leq \Delta \dot{L}_y \leq m(\ddot{z}_g + g)(x_{zmp}^{lower} - x_{zmp}^{org}) \quad (24)$$

You can calculate as follows. However, the original ZMP position is $x_{zmp}^{org}$ and $y_{zmp}^{org}$.

When Equations (23) and (24) are combined into matrices,

Mathematical Formula 44

$$P\Delta \dot{L} \leq w \quad (25)$$

Mathematical Formula 45

$$P := \begin{bmatrix} 1 & 0 & 0 \\ -1 & 0 & 0 \\ 0 & 1 & 0 \\ 0 & -1 & 0 \end{bmatrix}$$

$$q := \begin{bmatrix} m(\ddot{z}_g + g)(y_{zmp}^{upper} - y_{zmp}^{org}) \\ -m(\ddot{z}_g + g)(y_{zmp}^{lower} - y_{zmp}^{org}) \\ -m(\ddot{z}_g + g)(x_{zmp}^{lower} - x_{zmp}^{org}) \\ m(\ddot{z}_g + g)(x_{zmp}^{upper} - x_{zmp}^{org}) \end{bmatrix}$$

Thus, it can be described in the form of linear inequality constraints.

Equation (10) may be expressed as:

Mathematical Formula 46

$$\Delta \dot{L}^T T_p \Delta \dot{L} = 0$$

Noting that,

Mathematical Formula 47

$$V \Delta \dot{L} = w \quad (26)$$

Mathematical Formula 48

$$V := \dot{L}^T T_p + p^T \quad w := p_z(n_z^{limit} - n_z)$$

It becomes. Therefore, by adding Equation (23) to the optimization problem (11) and configuring the following optimization problem, it is possible to obtain a value that minimizes the correction amount ΔL· of the moment vector around the center of gravity while limiting ZMP variation amount.

Mathematical Formula 49

$$\min \frac{1}{2} \Delta \dot{L}^T \Delta \dot{L} \text{ s.t. } \begin{array}{l} V \Delta \dot{L} = w \\ P \Delta \dot{L} \leq q \end{array} \quad (27)$$

Equation (27) is a convex quadratic programming problem and can be solved at high speed by various existing solving methods such as the inner point method or the active set method.

As shown in FIGS. 6, S601, S602, and S603 are the same as those in S101, S102, S103 of the first embodiment, and therefore will not be described. If $n_z$ is not within the frictional limits (No of S603), then the upper and lower ZMP limits are obtained (S604). Next, using Equations (23) and (24), the upper and lower limits of the correction amounts of the moment vector around the center of gravity are calculated (S605). Next, the coefficient P, q, V, w of the optimization problem is calculated using Equations (25) and (26) (S606). Next, using Equation (27), a convex quadratic programming issue is solved (S607). The moment vector around the center of gravity is then modified (S608) and the whole body pose is determined (S609).

According to the above-described methods, the calculation unit can calculate the upper and lower limits of the horizontal-axis components of the correction amount of the moment vector around the center of gravity based on the allowable range of ZMP, and can obtain the correction amount of the moment vector around the center of gravity by the convex quadratic programming method. This limits ZMP and prevents ZMP from exiting the support area.

Figure 7:
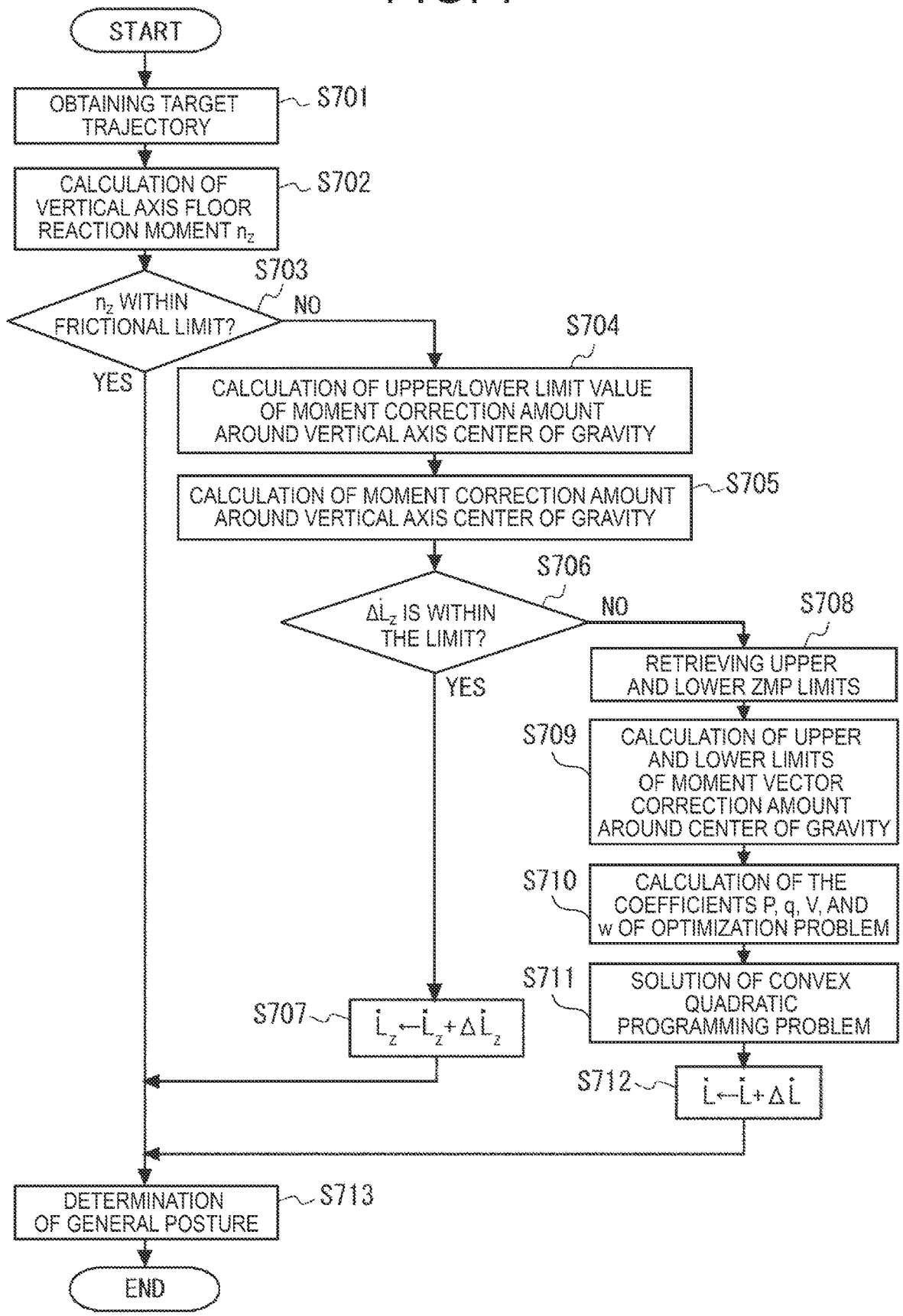
FIG. 7 is a flow chart for determining a correction amount of a moment vector around a center of gravity according to a sixth embodiment.

Description of Correction of Moment Vector Around Center of Gravity According to Sixth Embodiment FIG. 7 is a flowchart for obtaining the correction amount of the moment vector around the center of gravity according to the sixth embodiment. With reference to FIG. 7, modification of the moment vector around the center of gravity according to the sixth embodiment will be described.

Sixth embodiment is configured to combine the fourth and fifth embodiments to include the determination of the correction of the moment around the center of gravity of the vertical axis before the correction of the moment vector around the center of gravity. As shown in FIG. 7, S701, S702, S703 are the same as those in S101, S102, S103 of the first embodiment, and therefore will not be described. S704, S705, S706, S707 is the same as in S504, S505, S506, S507 of the fourth embodiment. S708, S709, S710, S711, S712 are the same as in S604, S605, S606, S607, S608 of the fifth embodiment.

As can be seen from FIG. 7, when the floor reaction force moment around the vertical axis can be compensated within the range of the arm swing limit or the like, that is, within the upper and lower limits of the correction of the moment around the center of gravity of the vertical axis, the moment vector around the center of gravity is not corrected.

Figure 8:
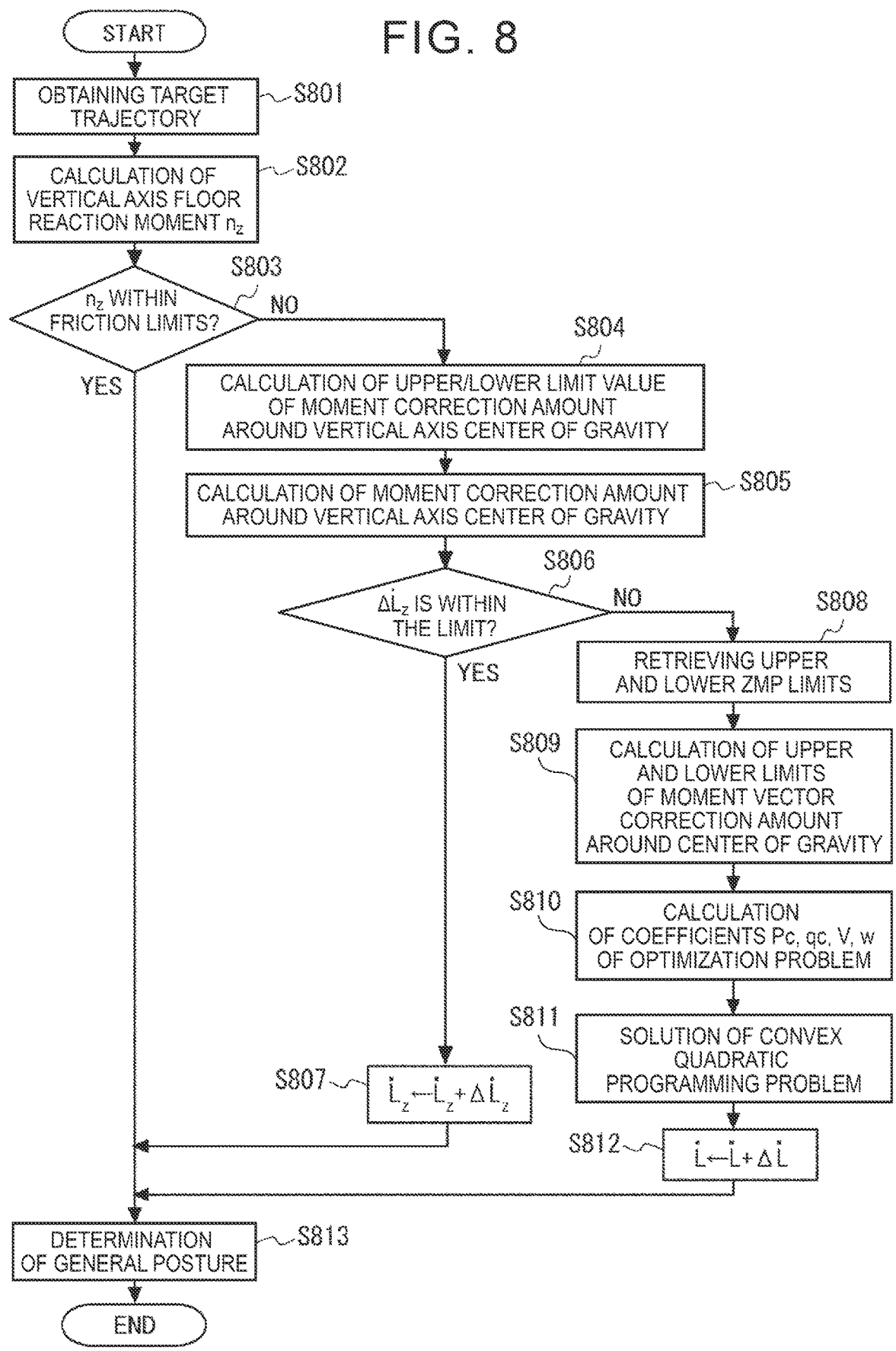
FIG. 8 is a flow chart for obtaining the correction amount of the moment vector around the center of gravity according to of a seventh embodiment.

Description of Correction of Moment Vector Around Center of Gravity According to Seventh Embodiment FIG. 8 is a flowchart for obtaining the correction amount of the moment vector around the center of gravity according to the seventh embodiment. With reference to FIG. 8, the correction of the moment vector around the center of gravity according to the seventh embodiment will be described.

In the seventh embodiment, not only ZMP constraint of the sixth embodiment, but also the limitation of the correction amount of the moment around the center of gravity of the vertical axis, in addition to the constraint, constitutes an optimization issue. Specifically, Equations (21) and (22) are added to Equation (23), Mathematical Formula 50

$$P_c \Delta \dot{L} \leq q_c \qquad (28)$$

Mathematical Formula 51

$$P_c := \begin{bmatrix} 1 & 0 & 0 \\ -1 & 0 & 0 \\ 0 & 1 & 0 \\ 0 & -1 & 0 \\ 0 & 0 & 1 \\ 0 & 0 & -1 \end{bmatrix}$$

$$q_c := \begin{bmatrix} m(\ddot{z}_g + g)(y_{zmp}^{upper} - y_{zmp}^{org}) \\ -m(\ddot{z}_g + g)(y_{zmp}^{lower} - y_{zmp}^{org}) \\ -m(\ddot{z}_g + g)(x_{zmp}^{lower} - x_{zmp}^{org}) \\ m(\ddot{z}_g + g)(x_{zmp}^{upper} - x_{zmp}^{org}) \\ \Delta \dot{L}_z^{upper} \\ -\Delta \dot{L}_z^{upper} \end{bmatrix}$$

A convex quadratic programming problem with inequality constraints set as shown

Mathematical Formula 52

$$\min \frac{1}{2} \Delta \dot{L}^T \Delta \dot{L} \text{ s.t. } \begin{matrix} V \Delta \dot{L} = w \\ P_c \Delta \dot{L} \leq q_c \end{matrix} \qquad (29)$$

By solving, the correction amount $\Delta L \cdot$ of the moment vector around the center of gravity is obtained.

With this configuration, the calculation unit calculates the limit value of the correction amount of the moment around the center of gravity of the vertical axis based on the movable range and the speed range of the arm swing and the torsion of the body, and obtains the correction amount of the moment vector around the center of gravity by the convex quadratic programming method using the upper and lower limits of the horizontal axis component of the correction amount of the moment vector around the center of gravity based on the allowable range of ZMP and the upper and lower limits of the vertical component of the correction amount of the moment vector around the center of gravity. Therefore, the correction amount of the minimum moment vector around the center of gravity can be obtained while satisfying the constraints such as the constraint and the arm swing limit. In addition, as in the sixth embodiment, if only the correction of the moment around the center of gravity of the vertical axis can be performed, the correction of the moment vector around the center of gravity accompanied by ZMP variation is not performed. Therefore, it is possible to take the best response according to the situation.

As shown in FIG. 8, S801, S802, S803 is the same as that of S101, S102, S103 of the first embodiment, and therefore will not be described. S804, S805, S806, S807 is the same as in S504, S505, S506, S507 of the fourth embodiment. S808, S809 is the same as in S604, S605 of the sixth embodiment.

Next, using Equations (26) and (28), the coefficients $P_c$, $q_c$, V, w of the optimization problem are calculated (S810). Next, using Equation (29), a convex quadratic programming issue is solved (S811). Next, the moment vector around the center of gravity is corrected (S812). Finally, the systemic position is determined (S813).

Further, the present embodiment is configured based on the first embodiment. However, the effect of the correction amount $\Delta L \cdot$ of the moment vector around the center of gravity can be combined with the configuration of the second embodiment such that not only ZMP variation but also a part of the correction amount is reflected in the acceleration correction, or only the amount that violates the constraint by introducing the slack variable into ZMP constraint of Equation 28 is reflected in the acceleration correction.

The present disclosure is not limited to the above embodiments, and can be appropriately modified without departing from the spirit thereof.

What is claimed is:

1. A robot that moves with a leg, the robot comprising a processor, and
a memory storing program instructions that cause the processor to
calculate a floor reaction force moment around a vertical axis from a center of gravity of the robot, a zero moment point (ZMP) orbit, and a moment orbit around the center of gravity,
obtain a correction amount of a moment vector around the center of gravity when the floor reaction force moment around the vertical axis exceeds a frictional limit, and
control the robot based on the correction amount, wherein
the program instructions further cause the processor to:
determine, when the floor reaction force moment around the vertical axis exceeds the frictional limit, whether a correction amount of a moment around a center of gravity of the vertical axis exceeds a limit value;
correct, when the correction amount of the moment around the center of gravity of the vertical axis does not exceed the limit value, only the moment around the center of gravity of the vertical axis; and
correct, when the correction amount of the moment around the center of gravity of the vertical axis exceeds the limit value, the moment vector around the center of gravity.

2. The robot according to claim 1, wherein the program instructions cause the processor to obtain the correction amount of the moment vector around the center of gravity so as to minimize a norm.

3. The robot according to claim 1, wherein the program instructions cause the processor to correct acceleration and deceleration of a center of gravity orbit according to the correction amount of the moment vector around the center of gravity.

4. The robot according to claim 1, wherein the program instructions cause the processor to:
calculate the moment around the center of gravity of the vertical axis based on a movable range and a speed range of an arm swing and a body twist; and
compensate the floor reaction force moment around the vertical axis based on the calculated moment around the center of gravity of the vertical axis.

* * * * *